United States Patent
Harmon

Patent Number: 5,842,744
Date of Patent: Dec. 1, 1998

[54] DUAL POSITION LOCKING MECHANISM

[75] Inventor: Thomas G. Harmon, Rochester Hills, Mich.

[73] Assignee: Lear Corporation, Southfield, Mich.

[21] Appl. No.: 918,026

[22] Filed: Aug. 25, 1997

[51] Int. Cl.⁶ .................................................. B60N 2/02
[52] U.S. Cl. ........................ 297/378.11; 297/216.14; 297/216.13; 297/238
[58] Field of Search ........................... 297/216.1, 238, 297/331, 335, 378.11, 378.14, 216.13, 216.14

[56] References Cited

U.S. PATENT DOCUMENTS

| | | |
|---|---|---|
| 3,866,270 | 2/1975 | Suzuki et al. . |
| 4,165,128 | 8/1979 | Strowick et al. . |
| 4,634,182 | 1/1987 | Tanaka . |
| 4,707,010 | 11/1987 | Croft et al. . |
| 5,100,202 | 3/1992 | Hughes . |
| 5,163,735 | 11/1992 | Aljundi . |
| 5,265,936 | 11/1993 | Droulon et al. . |
| 5,265,937 | 11/1993 | Allen . |
| 5,282,668 | 2/1994 | Heussner et al. . |
| 5,346,281 | 9/1994 | Hughes . |
| 5,370,440 | 12/1994 | Rogala . |
| 5,375,915 | 12/1994 | Harry et al. . |
| 5,380,060 | 1/1995 | Sponsler et al. . |
| 5,460,429 | 10/1995 | Whalen . |
| 5,507,553 | 4/1996 | Nishizawa et al. . |
| 5,556,159 | 9/1996 | Canteleux . |
| 5,603,550 | 2/1997 | Holdampf et al. . |

Primary Examiner—Milton Nelson, Jr.
Attorney, Agent, or Firm—Brooks & Kushman P.C.

[57] ABSTRACT

A vehicle seat assembly includes a locking mechanism for locking a seat component in a stowed or use position for preventing sudden pivotal movement of the seat component in a sudden high energy acceleration or deceleration. The locking mechanism includes a support bracket adapted for mounting on the vehicle floor and a pivot plate pivotally mounted to the support bracket. The pivot plate is secured to the vehicle seat component for pivotal movement therewith. The pivot plate includes a plurality of lock teeth extending therefrom. A pendulum member or pawl is pivotally connected to the support bracket and operative for locking engagement with the lock teeth for preventing substantial seat component movement in a forward or rearward high energy impact.

11 Claims, 4 Drawing Sheets

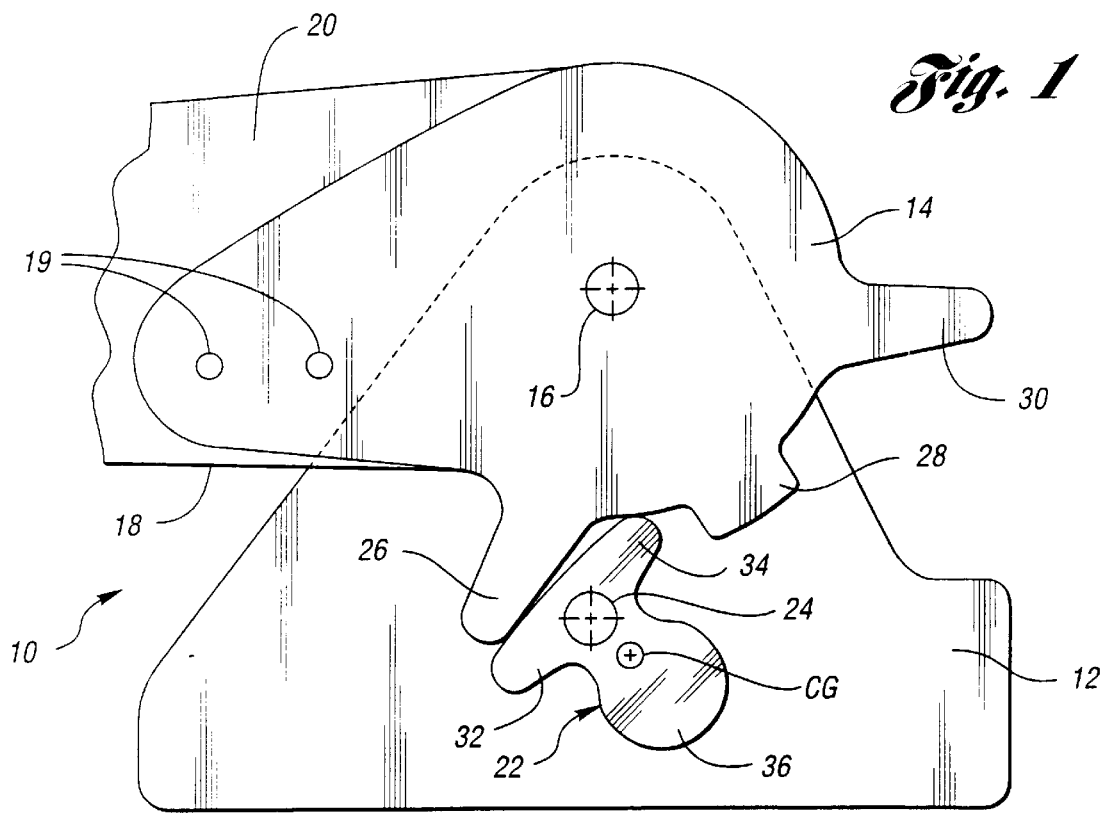
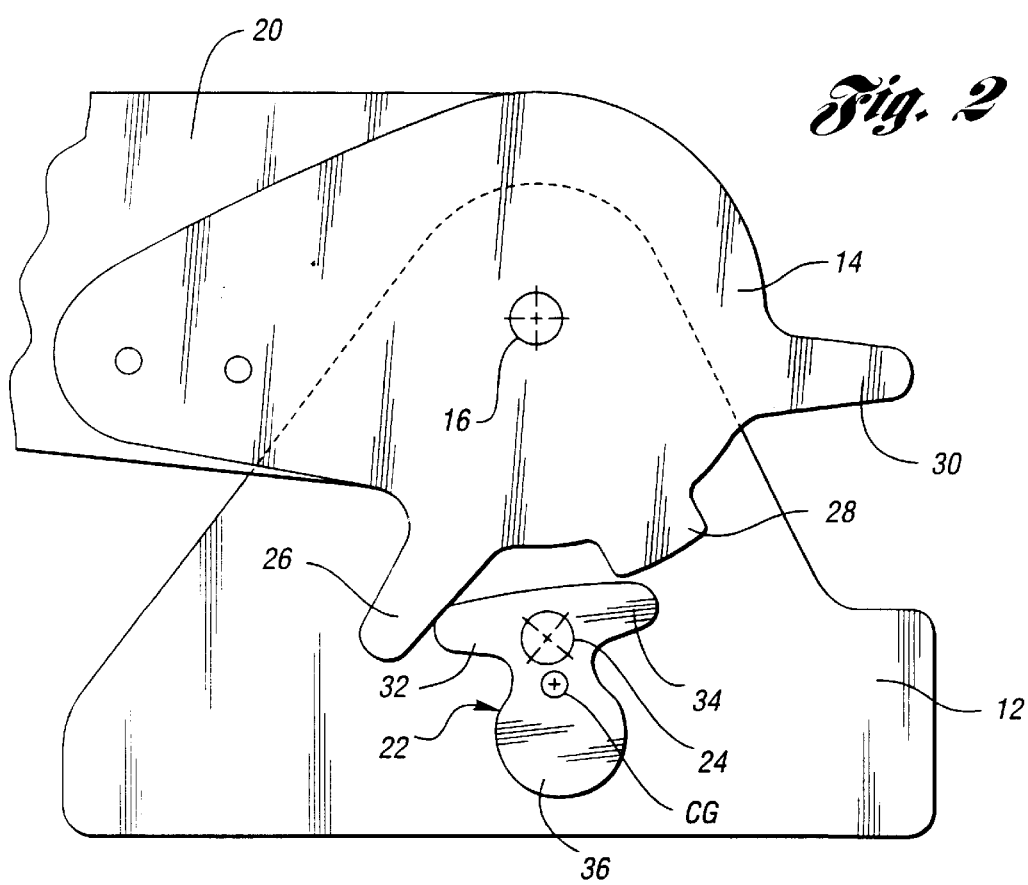

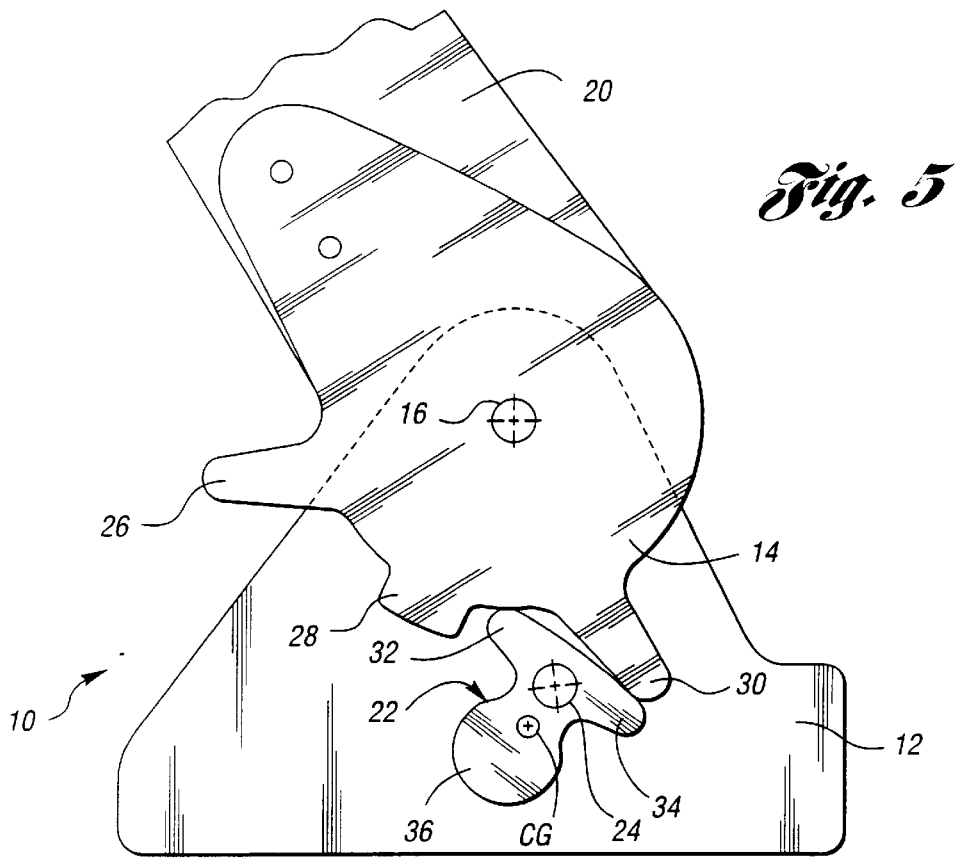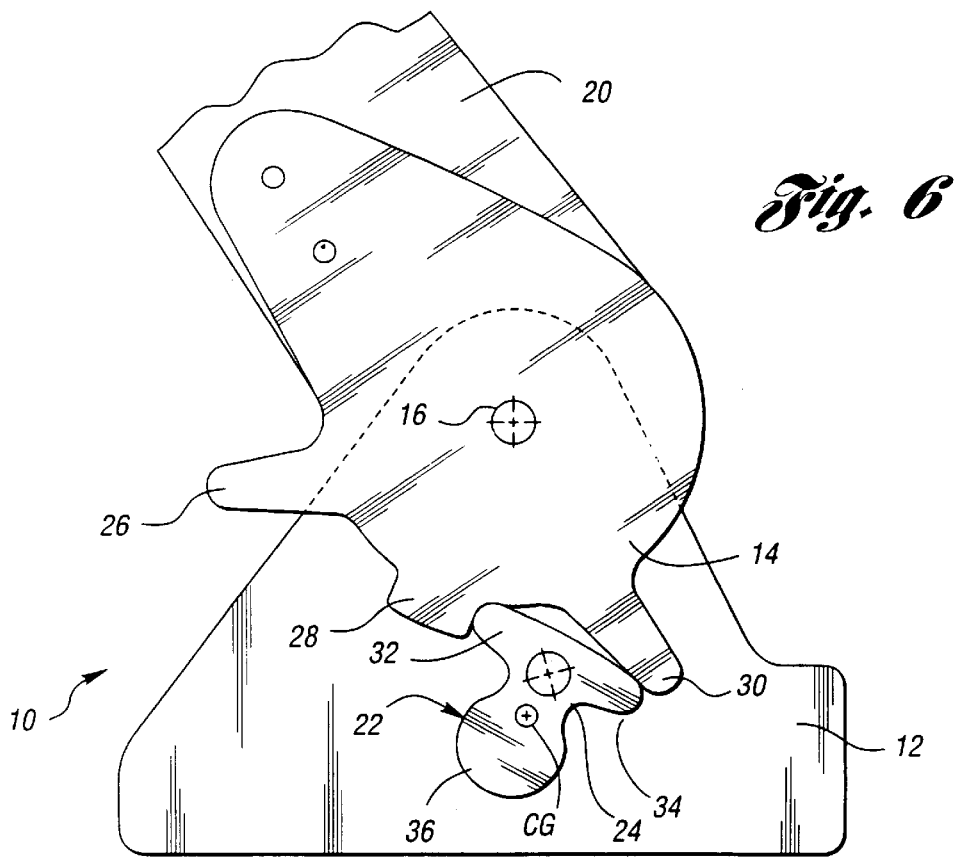

DUAL POSITION LOCKING MECHANISM

TECHNICAL FIELD

The present invention relates to a locking mechanism for a vehicle seat, and more particularly to a dual position locking mechanism which is operative to lock a seat component in an upright or stowed position in a high-energy impact while allowing normal pivotal movement of the seat component between stowed and use positions by a user.

BACKGROUND OF THE INVENTION

Typical vehicle seat locking mechanisms include a single pawl mechanism for preventing sudden seat component movement in a single direction of acceleration, as in a high-energy impact. Other designs include multiple pawls in order to prevent seat movement from various seat positions resulting from different directions of sudden acceleration.

It is particularly desirable to prevent sudden pivotal movement of a seat component in integral seat child restraint systems, and in stadium-type vehicle seating, such as those used as rear seats in a truck against a rear cab wall. It is undesirable to have the lower seat frame fold-up against the occupant in a rearward impact, or surge forward in a forward impact. It is further desirable to provide such a locking mechanism with minimal components for manufacturing cost reduction.

DISCLOSURE OF THE INVENTION

In Lear Corporation's continuing efforts to improve vehicle safety, the present invention provides a locking mechanism for preventing sudden pivotal movement of a vehicle seat component in a high-energy impact by providing a pivot plate with a lock tooth assembly which is selectively engageable with a pendulum member in the event of a sudden forward or rearward acceleration when the seat is in a stowed or use position.

More specifically, the present invention provides a locking mechanism for preventing sudden pivotal movement of a vehicle seat component in a high-energy impact. The locking mechanism comprises a support bracket adapted for mounting on the vehicle floor, a pivot plate is pivotally mounted to the support bracket and secured to the vehicle seat component for pivotal movement therewith. The pivot plate also includes a plurality of lock teeth. A pendulum member is pivotally connected to the support bracket and operative for locking engagement with the lock teeth for preventing substantial pivotal movement of the seat component in a forward or rearward high-energy impact.

In a preferred embodiment, the seat assembly is a stadium-type vehicle seat having a lower cushion frame which is pivotable between stowed and use positions. Preferably, the pendulum member comprises a lobe portion operative as a gravity release actuator for preventing engagement of the pendulum member with the lock teeth as the lower cushion frame is pivoted between the stowed and use positions by a user.

Also, the lock teeth preferably comprise first and second outer teeth formed integrally as part of the pivot plate and a middle tooth member positioned between the first and second outer teeth.

Accordingly, an object of the present invention is to provide a vehicle seat assembly locking mechanism which prevents sudden pivotal movement of a vehicle seat component in a high energy forward or rearward impact when the seat component is in either a stowed or use position, while allowing pivotal movement of the seat component in normal use.

The above object and other objects, features and advantages of the present invention are readily apparent from the following detailed description of the best mode for carrying out the invention when taken in connection with the accompanying drawing.

BRIEF DESCRIPTION OF THE DRAWINGS

FIG. 1 shows a schematically arranged cut away side view of a vehicle seat assembly including a locking mechanism, with the seat component in the use position;

FIG. 2 shows a schematically arranged cut-away side view of the seat assembly of FIG. 1 with the seat component pivoting between the stowed and use positions in normal operating conditions;

FIG. 5 shows a schematically arranged side view of the seat assembly of FIG. 1 with the seat component in the stowed position;

FIG. 6 shows a schematically arranged side view of the seat assembly of FIG. 1 with the locking mechanism locked to secure the seat component in the stowed position in a front impact;

DETAILED DESCRIPTION OF THE PREFERRED EMBODIMENT

Figure 3:
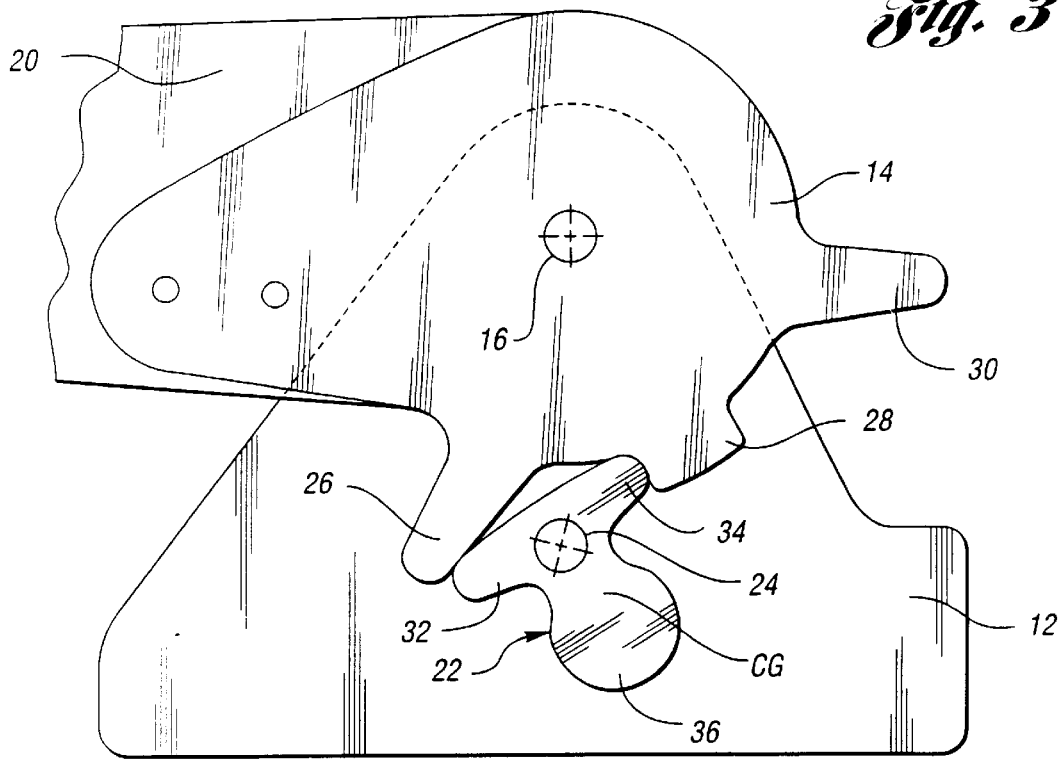
FIG. 3 shows a schematically arranged cut-away side view of the seat assembly of FIG. 1 with the locking mechanism engaged for securing the seat component in the use position in a rear impact.

FIG. 1 shows a schematically arranged side view of a stadium-type vehicle seat assembly 10 in accordance with the present invention. The vehicle seat assembly 10 includes a support bracket 12 adapted for mounting on the vehicle floor. A seat member or pivot plate 14 is pivotally mounted to the support bracket 12 at the pivot joint 16. The seat member or pivot plate 14 includes a lower attachment portion 18 which is attached to the lower cushion frame 20 by means of screws or bolts cooperating with the apertures 19. Alternatively, the pivot plate 14 could be a part of the lower cushion frame.

This vehicle seat assembly 10 is preferably intended for use in a stadium-type vehicle seat arrangement, such as that used against the rear cab of a pick-up truck, or in an integral seat child restraint system.

A pendulum member or pawl 22 is pivotally connected to the support bracket 12 at a pivot joint 24, and is operative for locking engagement with the lock teeth 26,28,30, which extend from the pivot plate 14, for preventing substantial sudden lower cushion frame 20 movement in a forward or rearward high energy impact.

The pendulum member 22 includes stop arms 32,34 configured for selective engagement with the teeth 26,28,30. The pendulum member 22 further includes a lobe portion 36 which adds mass to the lower portion of the pendulum member 22 for causing the center of gravity CG to be positioned below the pivot joint 24. Accordingly, the pendulum member 22 acts a gravity release mechanism by means of the pivoting motion thereof caused by the location of the center of gravity CG of the pendulum member 22.

Figure 4:
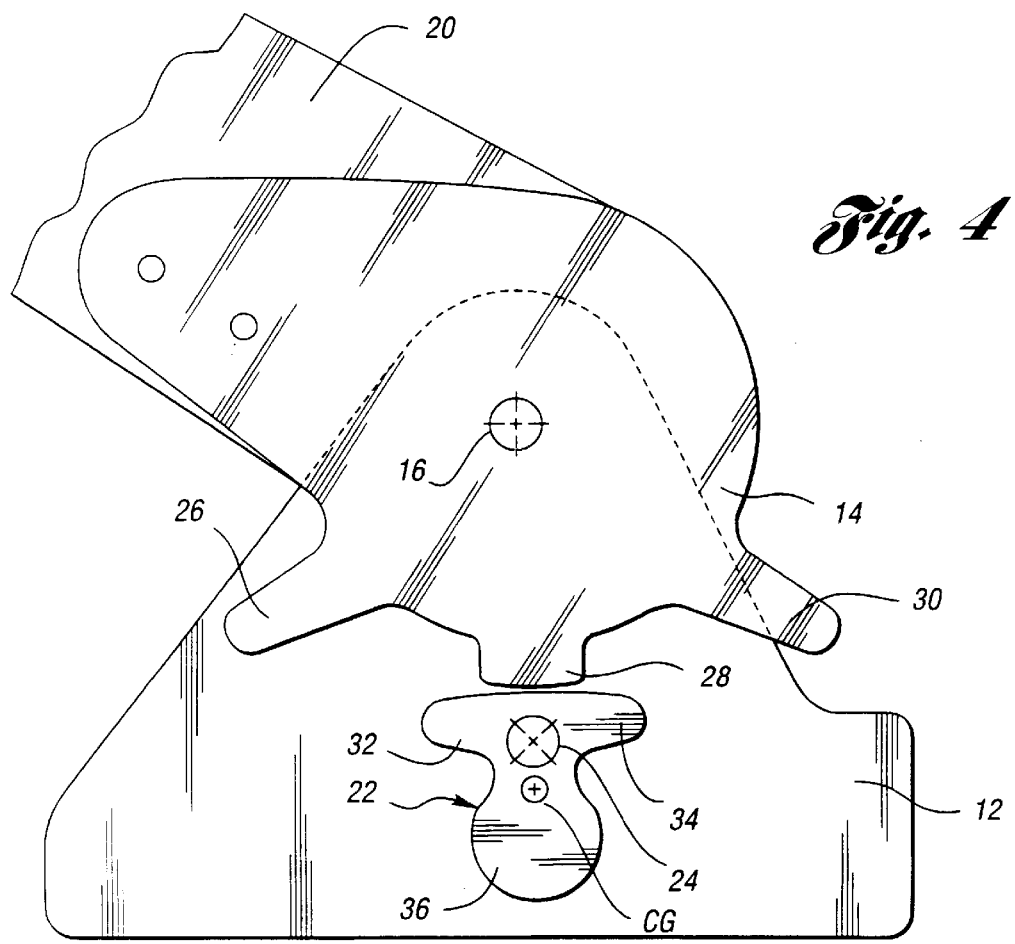
FIG. 4 shows a schematically arranged side view of the seat assembly of FIG. 1 with the seat component being further pivoted between stowed and use positions under normal operating conditions.

As shown in FIG. 1, the lower seat cushion frame 20 is in the use position, and the pendulum member 22 is engaged against the first tooth 26 for holding the lower seat cushion frame 20 in the use position. Turning to FIG. 2, as the user rotates the lower seat cushion frame 20 between the use and stowed positions, the center of gravity CG of the pendulum member 22 causes the pendulum member 22 to rotate about the pivot joint 24 such that the stop arm 34 of the pendulum member 22 clears the middle tooth 28 so that the pivot plate 14 and lower cushion frame 20 may freely rotate to the position shown in FIG. 4, and further to the stowed position illustrated in FIG. 5.

Returning to FIG. 1, if the vehicle were suddenly subject to a rear impact force in the forward direction (i.e., an impact from the rear of the vehicle), then the lower seat cushion frame 20 would tend to fold-up, i.e., pivot clockwise about the pivot joint 16. At the same time, the center of gravity CG of the pendulum member 22 will cause the pendulum member 22 to rotate counterclockwise about the pivot joint 24 as a result of the forward force, and the stop arm 34 will engage against the middle tooth 28, as illustrated in FIG. 3, to prevent further pivotal movement of the lower cushion frame 20, thus locking the lower cushion frame 20 in position.

Turning to FIG. 5, when the lower cushion frame 20 is in the upright, stowed position, the pendulum member 22 rests against the tooth 30. If the user wishes to pivot the lower seat cushion frame 20 from the stowed position to the use position, the center of gravity CG of the pendulum member 22 allows such movement by naturally pivoting the stop arm 32 to prevent engagement with the middle tooth 28 as the lower seat cushion frame 20 is pivoted down. However, in a sudden frontal impact (i.e., an impact at the front of the vehicle), the lower cushion frame 20 will tend to collapse forward, i.e., rotate counterclockwise about the pivot joint 16. In such an impact, the center of gravity CG of the pendulum member 22 will cause the pendulum member 22 to rotate clockwise about the pivot joint 24 such that the stop arm 32 engages the side of the middle tooth 28, as illustrated in FIG. 6, to prevent the lower cushion frame 20 from collapsing forward upon such an impact. Accordingly, the lower cushion frame 20 is locked in the stowed position.

Therefore, the pendulum member 22 of the present invention allows normal pivotal movement of the seat component 20 between the stowed and use positions, while preventing folding up or collapsing of the seat component in a forward or rearward high energy impact. Alternatively, springs could be provided for preventing rattle in the pendulum member 22 by simply biasing the pendulum member with respect to the pivot plate teeth 26,28,30. Also, a seat back may also be attached to the pivot plate 14 in a stadium-type seating arrangement.

The advantages of the present invention are accomplished with the use of only a single pawl or pendulum member to maintain the locking configuration. Formerly, designs relied upon multiple pawls in order to remain active within various positions and/or directions of acceleration.

Figure 7:
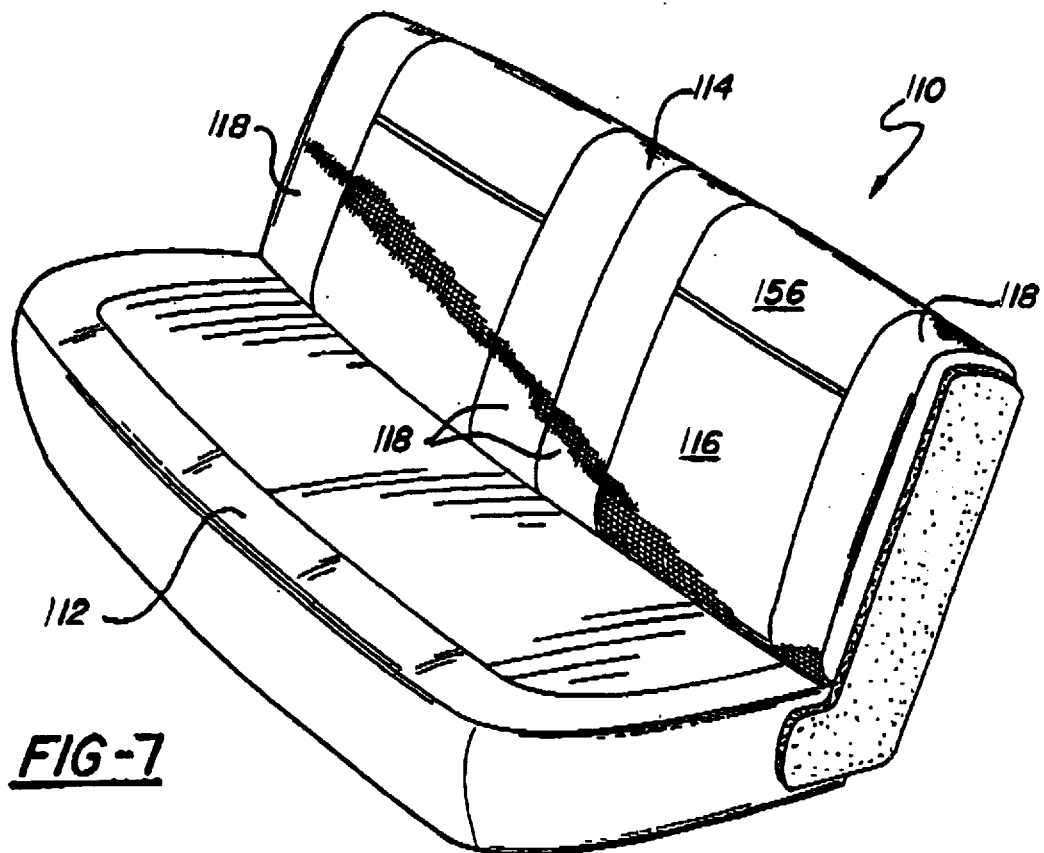
FIG. 7 is a perspective view of a passenger seat for use with an alternative embodiment of the invention.
Figure 8:
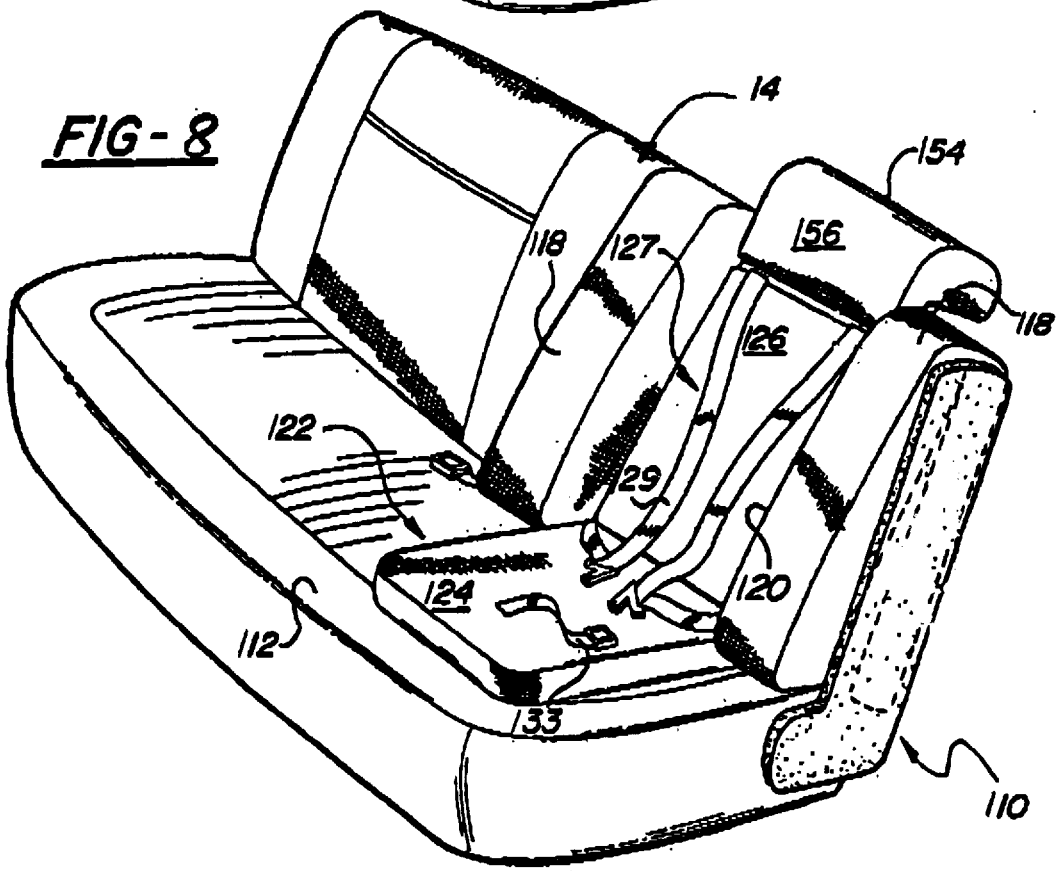
FIG. 8 is a perspective view of the adult passenger seat of FIG. 7 including a child restraint seat component which may be adapted to include a dual position latching mechanism in accordance with the present invention.

As described above, the present invention is adaptable for use in stadium-type seating arrangements, including such arrangements used for an integral seat child restraint system, as described below. Referring to FIGS. 7 and 8, an adult seat 110 is shown as described in commonly owned U.S. Pat. No. 5,282,668, which is hereby incorporated by reference in its entirety. The adult seat 110 includes a generally horizontal seat portion 112 and a generally vertical or upright backrest portion 114. The backrest 114 includes a center back support area 116 and side bolsters 118.

The adult backrest further includes a cavity 120 recessed in the face of the adult backrest portion 114 for receiving a child restraint seat component as generally indicated at 122. The cavity 120 is disposed between the side bolsters 118 and forms a portion of the adult back rest 114 extending from the seat portion 112 to the upper end of the backrest 114.

The child restraint seat 122 comprises a child seat portion 124 pivotally secured at one end to the adult passenger seat 110 and pivotable between a folded position recessed in the cavity 120 forming a lower portion of the adult backrest 114, as shown in FIG. 1, and an unfolded use position pivoted forwardly and downwardly and lying parallel against the adult seat portion 112, as shown in FIG. 2. A child backrest portion 126 is disposed against the back wall of cavity 120 and includes an upper end pivotally connected to the adult backrest 114 for providing pivotal rotation of the child backrest 126 between a first position parallel with the adult backrest 114 and a second inclined position tilted outwardly from the first position.

The child seat component 122 includes a safety belt harness system 127 having two shoulder harnesses 129 extending over the upper portion of the backrest 126, and a center strap 133 extends through the seat portion 124 and is fixed to a portion of the main seat frame. The assembly also includes a movable headrest 154 having a front face 156.

As described above, the child restraint seat component 122 could replace the seat member or pivot plate 14 previously described with reference to FIGS. 1–6, and a plurality of lock teeth could similarly extend from the child restraint seat member 122. Also, a pendulum member as described above with reference to FIGS. 1–6 could be provided adjacent the lock teeth of the child restraint seat member 122 for preventing substantial sudden movement of the child restraint seat member 122 in both a forward or rearward high energy acceleration or deceleration.

The present invention may also be used in a rearward facing integral child restraint seat system, such as that described in U.S. Pat. No. 4,555,135, which is hereby incorporated by reference in its entirety.

While the best mode for carrying out the invention has been described in detail, those familiar with the art to which this invention relates will recognize various alternative designs and embodiments for practicing the invention within the scope of the appended claims.

What is claimed is:

1. A stadium-type vehicle seat assembly for use in a vehicle having a vehicle floor comprising:

a support bracket adapted for mounting on the vehicle floor;

a seat member pivotally mounted to the support bracket, and including a plurality of lock teeth; and a pendulum member pivotally connected to the support bracket and operative for locking engagement with the lock teeth while pivoting in opposing forward and rearward rotational directions for preventing substantial seat member movement in both a forward and rearward high-energy impact.

2. The seat assembly of claim 1, wherein said plurality of lock teeth comprise:

first and second outer teeth formed integrally as part of the pivot plate; and a middle tooth member positioned between the first and second outer teeth.

3. The seat assembly of claim 1, wherein the seat member comprises an integral seat child restraint component.

4. The seat assembly of claim 1, wherein said pendulum member comprises a center of gravity below the pivotal connection with the support bracket for facilitating operation as a gravity release mechanism for preventing engagement of the pendulum member with the lock teeth as the seat member is pivoted between stowed and use positions by a user.

5. The seat assembly of claim 4, wherein said pendulum member comprises a lobe portion operative as the gravity release mechanism.

6. The seat assembly of claim 4, wherein said pendulum member further comprises opposing stop arms configured for selective engagement with the lock teeth.

7. A locking mechanism for preventing sudden pivotal movement of a vehicle seat component in a high energy impact in a vehicle having a vehicle floor, the locking mechanism comprising:

a support bracket adapted for mounting on the vehicle floor;

a pivot plate pivotally mounted to the support bracket and attachable to the vehicle seat component for pivotal movement therewith, said pivot plate further including a plurality of lock teeth; and a pendulum member pivotally connected to the support bracket and operative for locking engagement with the lock teeth while pivoting in opposing forward and rearward rotational directions for preventing substantial seat component movement in both a forward and rearward high-energy impact.

8. The locking mechanism of claim 7, wherein said lock teeth comprise:

first and second outer teeth formed integrally as part of the pivot plate; and a middle tooth member positioned between the first and second outer teeth.

9. The locking mechanism of claim 7, wherein said pendulum member comprises a lobe portion operative as a gravity release actuator for preventing engagement of the pendulum member with the lock teeth as the seat component is pivoted between stowed and use positions by a user.

10. The locking mechanism of claim 9, wherein said pendulum member further comprises opposing stop arms configured for selective engagement with the lock teeth.

11. A locking mechanism for preventing sudden pivotal movement of a vehicle seat component in a high-energy impact, the locking mechanism comprising:

a support bracket adapted for mounting on the vehicle floor;

a pivot plate pivotally mounted to the support bracket and attachable to the vehicle seat component for pivotal movement therewith, said pivot plate further including a plurality of lock teeth; and a pendulum member pivotally connected to the support bracket and operative for locking engagement with the lock teeth while pivoting in opposing forward and rearward rotational directions for preventing substantial seat component movement in both a forward and rearward high-energy impact when the seat component is in either a stowed or use position;

wherein said pendulum member comprises a lobe portion operative as a gravity release actuator for preventing engagement of the pendulum with the lock teeth as the seat component is pivoted between stowed and use positions by a user.

* * * * *